May 3, 1966
L. R. MOFFITT
3,249,796
SWEEP MARKER CIRCUIT
Filed Aug. 12, 1963
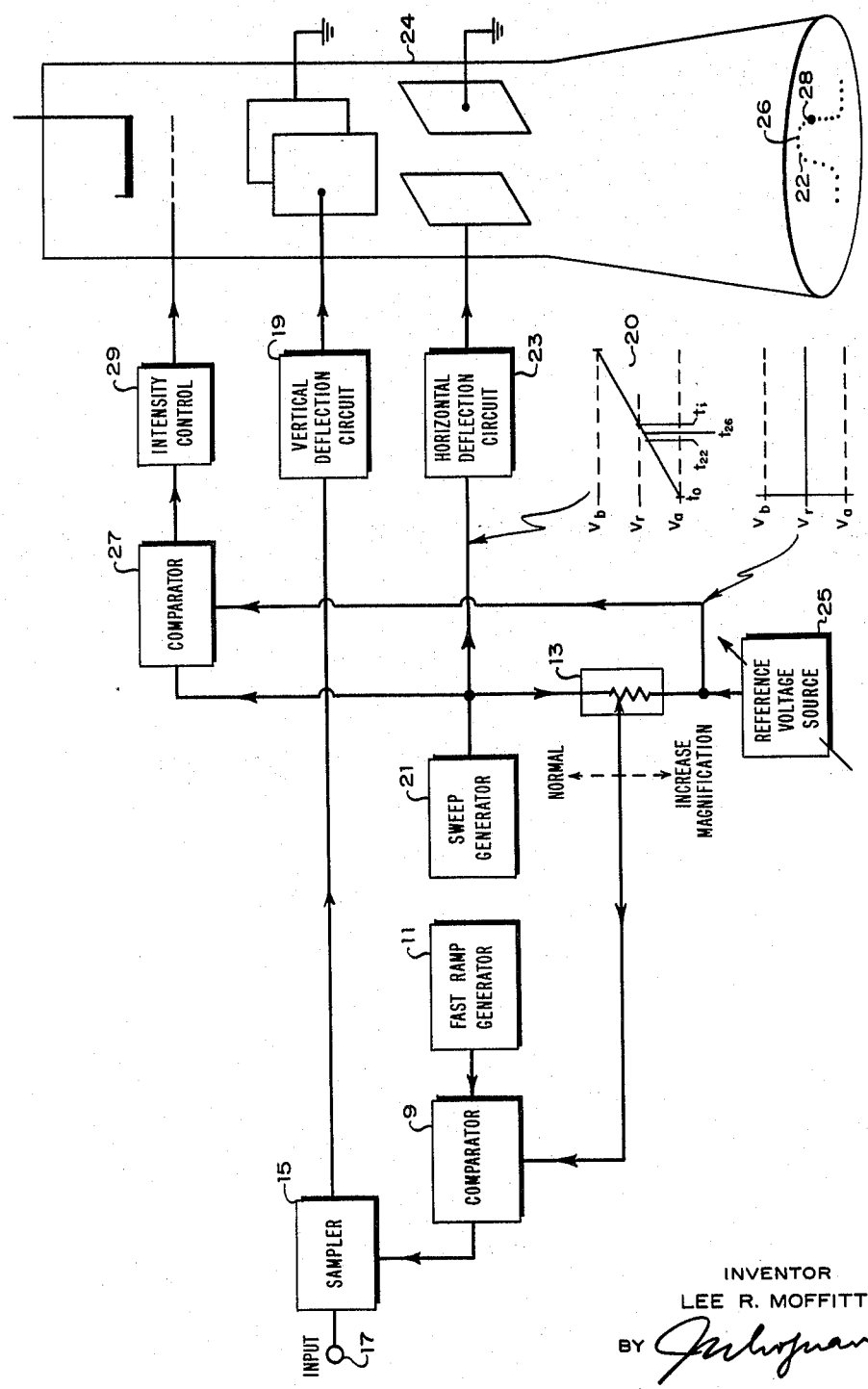
INVENTOR
LEE R. MOFFITT
BY
ATTORNEY United States Patent Office 3,249,796
Patented May 3, 1966

3,249,796
SWEEP MARKER CIRCUIT
Lee R. Moffitt, Palo Alto, Calif., assignor to Hewlett-Packard Company, Palo Alto, Calif., a corporation of California
Filed Aug. 12, 1963, Ser. No. 301,442
3 Claims. (Cl. 315—22)

This invention relates to sweep circuits of the type used in sampling oscilloscopes.

The sweep circuit of a sampling oscilloscope should provide horizontal displacement of successive samples along the displayed waveform as a function of time. This is conventionally accomplished by providing a slow ramp or staircase voltage which is applied to the horizontal deflection plates. At each recurring waveform, a fast linear voltage is generated. A coincidence detector or voltage comparator is used to determine the instant when this sweep voltage crosses the ramp voltage. At that instant, a very short pulse is generated which has an amplitude proportional to the level of the waveform at the corresponding point in time. Thus, with each successive recurrence of the waveform under examination, the sampling point moves with equal increments along the waveform.

It is sometimes necessary to observe a particular portion of the displayed waveform in more detail. For this purpose it is desirable to expand the waveform without varying the sweep or sampling rate. One such device is a time-scale magnifier which expands the apparent time base of the displayed waveform and thus permits scanning over a particular portion of the waveform under examination. It is desirable in these applications to mark in a contrasting manner a selected event on the displayed waveform and to expand about the selected event with the mark retained in relatively fixed position on the display screen.

Accordingly, it is an object of the present invention to provide a sweep marker for the horizontal sweep of a sampling oscilloscope.

It is another object of the present invention to provide a sweep marking circuit which produces a contrasting sample at a point which remains fixed at any selected location along the sweep as the time scale of the sweep is magnified about the point.

In accordance with the illustrated embodiment of the present invention, the output of a sweep generator which produces a staircase or ramp signal is applied to the horizontal deflection circuit of the oscilloscope. The sweep signal is applied to an input of a first comparator through an attenuator which provides the desired time scale magnification. This sweep signal is compared with a recurring fast ramp signal in the first comparator to produce an output which determines the instant at which a sample is taken of the waveform under examination. The sweep signal is also compared with a variable reference voltage in a second comparator, the output of which determines the sample or samples in the sweep which are contrastingly displayed. The reference voltage is also applied to the attenuator to insure that time scale magnification occurs about the sample point which is contrastingly displayed.

Other and incidental objects of the present invention will be apparent from a reading of this specification and an inspection of the accompanying drawing which shows a block diagram of a sweep circuit according to the present invention.

Referring to the drawing there is shown a comparator 9 which is connected to receive the signal from fast ramp generator 11 and from the output of time scale magnifier 13. The output of comparator 9 is applied to sampler 15 which is rendered conductive thereby to produce a sample pulse of the signal appearing at input terminal 17. The sample pulse from the output of sampler 15 is applied to vertical deflection circuit 19. The output signal of sweep generator 21 is applied to the horizontal deflection circuit 23. Reference voltage from source 25 is applied to one input of time-scale magnifier 13 and the sweep voltage from sweep generator 21 is applied to another input of the magnifier 13. At the same time, these voltages are compared in comparator 27 which applies an output signal to beam intensity control 29 when the sweep voltage and the reference voltage from source 25 are equal.

In operation, the sweep signal 20 (which may be a slowly varying ramp or a staircase signal) produced by sweep generator 21 is applied to the horizontal deflection circuit 23 to provide the horizontal deflection of the electron beam of the cathode-ray oscilloscope tube 24. If the time-scale magnifier 13 is set at the normal position, the sweep signal is compared in comparator 9 with the fast ramp signal from generator 11. At the instant when the two signals are equal, comparator 9 triggers sampler 15 into momentary conduction, thereby producing a sample pulse of the signal at input terminal 17. This pulse is displayed at a point 22 along the horizontal sweep. Another fast ramp signal is produced by generator 11 on a selected recurrence of the signal at input terminal 17. This fast ramp signal is compared with the same sweep signal 20 from generator 21 to produce another sample pulse for application to vertical deflection circuit 19. This pulse is displayed on the sweep at a point 26 which is displaced in time with respect to the first point by a time represented by the incremental change in the sweep signal 20. A plurality of samples of the signal at input terminal 17 are obtained and displayed in this manner as the sweep signal 20 varies between the limits $V_a$ and $B_b$ of its amplitude variations.

The reference voltage from source 25 may be manually varied between the same limits of amplitude variation traversed by the sweep signal 20. A signal is produced by comparator 27 at the time $t_i$ in each sweep when the sweep signal 20 equals the reference voltage from source 25. This output signal is applied to intensity control 29 to increase the beam intensity of the cathode-ray oscilloscope tube 24. This produces a contrastingly displayed sample 28 on the displayed wavefrom. Where desired, this output signal may be designed to last for the duration of the sweep, thereby producing an intensified portion of the displayed waveform after the intensified sample. The point along the sweep at which the intensified sample 28 is displayed is thus determined by varying the amplitude of the reference voltage from source 25. A selected event on the displayed wavefrom may thus be marked in this manner by varying the amplitude of this reference voltage until the contrasting sample is coincident with the selected event. Time-scale magnification about this point (i.e. both to the left and to the right of the point) is provided by adjusting the setting of time-scale magnifier 13. By a way of example, if the reference voltage is set at a value $V_r$ which is half way between the limits $V_a$ and $V_b$ of the sweep signal 20, an intensified sample is displayed in the center of the displayed sweep. If the sample density remains unchanged (i.e. the number of samples taken per sweep) and the time-scale magnifier 13 is adjusted to increase magnification, then a smaller portion of the cycle of the signal appearing at input terminal 17 and appearing about the center point will be sampled using the same number of samples. Because the sweep signal 20 is applied to the horizontal deflection circuit 23 without attenuation, this fixed number of samples in effect is spread out over the fixed sweep width. Thus expansion of the time scale is increased as the attenuation of sweep signal 20 is increased by adjusting the magnifier 13 to increase magnification. Since the time scale expansion is referenced to the voltage from source 25, expansion of the displayed signal occurs about the intensified sample point 28, the position of which is determined by the amplitude of the reference voltage from source 25.

Therefore the sweep marker circuit of the present invention provides electronic means for contrastingly marking a selected event on the signal displayed on the screen of a cathode-ray oscilloscope and for expanding the displayed signals in both directions about the contrastingly marked selected event.

I claim:

1. Signal apparatus which is responsive to a recurring signal, said apparatus comprising:
   a first comparator having a pair of inputs and adapted to produce a first output signal in response to signals applied to the inputs thereof bearing a predetermined relationship to each other;
   means generating a first signal which varies in amplitude during a period in which a plurality of recurrences of said input signal appear;
   means generating a second signal which varies in amplitude at each selected recurrence of the input signal;
   a source of reference voltage;
   means connected to an input of said comparator for applying thereto the combination of said first signal and reference voltage;
   means to apply said second signal to the other of said inputs of the first comparator;
   said first comparator producing a first output signal during each selected recurrence of said input signal;
   a second comparator having a pair of inputs and adapted to produce a second output signal in response to signals applied to the inputs thereof bearing a predetermined relationship to each other; and
   means to apply said reference voltage and said first signal to the inputs of said second comparator;
   said second comparator producing a second output signal during the variation in amplitude of said first signal.

2. Apparatus for displaying an input signal using an electron beam of a cathode-ray oscilloscope tube, said apparatus comprising:
   a first comparator having a pair of inputs and adapted to produce an output in response to signals applied to the inputs thereof bearing a predetermined relationship to each other;
   means generating a sweep signal;
   means generating a ramp signal at each selected recurrence of the input signal to be displayed;
   a source of reference voltage;
   means connected to an input of said comparator for applying thereto the combination of said sweep signal and reference voltage;
   means to apply said ramp signal to the other of said inputs of the first comparator;
   a second comparator having a pair of inputs and adapted to produce an output signal in response to signals applied to the inputs thereof bearing a predetermined relationship to each other;
   means to apply said reference voltage and said sweep signal to the inputs of said second comparator; and
   means responsive to the output of said second comparator to alter the intensity of the electron beam of said cathode-ray oscilloscope tube.

3. Apparatus for displaying an input signal using an electron beam of a cathode-ray oscilloscope tube, said apparatus comprising:
   a first comparator having a pair of inputs and adapted to produce an output in response to signals applied to the inputs thereof bearing a predetermined relationship to each other;
   means generating a sweep signal which varies in amplitude at a selected rate as a function of time;
   means connected to a pair of deflection plates of said tube for applying said sweep signal thereto;
   means generating a ramp signal at each selected recurrence of the input signal to be displayed;
   said ramp signal varying in amplitude at a faster rate than said sweep signal;
   a source of reference voltage;
   resistive means connected to an input of said comparator for applying thereto the combination of said sweep signal and reference voltage;
   means to apply said ramp signal to the other of said inputs of the first comparator;
   means responsive to the output of said first comparator for applying to another pair of deflection plates of said tube a signal related to the amplitude of said input signal;
   a second comparator having a pair of inputs and adapted to produce an output signal in response to signals applied to the inputs thereof bearing a predetermined relationship to each other;
   means to apply said reference signal and said sweep signal to the inputs of said second comparator; and
   means responsive to the output of said second comparator to alter the intensity of the electron beam of said cathode-ray oscilloscope tube.

References Cited by the Examiner

UNITED STATES PATENTS

| | | | |
|---|---|---|---|
| 2,399,955 | 5/1946 | Theisen | 315—22 |
| 2,671,182 | 3/1954 | Havens | 315—22 |
| 2,849,609 | 8/1958 | Casey | 315—29 X |
| 2,911,564 | 11/1959 | Jaffe | 315—22 |
| 3,119,949 | 1/1964 | Greatbach | 315—26 |

DAVID G. REDINBAUGH, *Primary Examiner.*

T. A. GALLAGHER, *Assistant Examiner.*